(12) United States Patent
Dublineau et al.

(10) Patent No.: US 6,923,931 B2
(45) Date of Patent: Aug. 2, 2005

(54) PROCESS FOR THE PRODUCTION OF HOLES PARTICULARLY MICRO-PERFORATIONS IN A COMPOSITE MATERIAL, DEVICE FOR ITS PRACTICE AND SOUND DAMPING LAYER CONSTITUTED BY SAID MATERIAL

(75) Inventors: Pascal Dublineau, Saulveur de Landermont (FR); Michel Buge, Saint Sebastien sur Loire (FR); Alain Porte, Colomiers (FR)

(73) Assignee: Airbus France, Toulouse Cedex (FR)

( * ) Notice: Subject to any disclaimer, the term of this patent is extended or adjusted under 35 U.S.C. 154(b) by 420 days.

(21) Appl. No.: 10/192,323

(22) Filed: Jul. 11, 2002

(65) Prior Publication Data

US 2003/0042657 A1 Mar. 6, 2003

(30) Foreign Application Priority Data

Jul. 12, 2001 (FR) .............................. 01 09294

(51) Int. Cl.[7] .................. B29C 39/00; C01B 31/00; H05B 6/00
(52) U.S. Cl. ................ 264/414; 264/413; 264/29.1; 264/29.5; 264/29.7; 264/154; 264/482; 264/40.1
(58) Field of Search .................. 264/413, 414, 264/482, 154, 29.1, 29.5, 29.7, 40.1

(56) References Cited

U.S. PATENT DOCUMENTS 5,741,456 A   4/1998  Ayrton
6,027,786 A * 2/2000  Ford ........................ 428/137
6,294,125 B1 * 9/2001  Bridgewater et al. ....... 264/400

FOREIGN PATENT DOCUMENTS

EP          0 314 353        5/1999

* cited by examiner

Primary Examiner—Stephen J. Lechert, Jr.
(74) Attorney, Agent, or Firm—Young & Thompson

(57) ABSTRACT

A process is described for the production of holes, particularly of micro-perforations, in a composite material, constituted by fibers embedded in a resinous matrix, characterized in that it consists in a preliminary step of carrying out on a specimen of the composite material, with the help of a laser beam, tests consisting in adjusting the duration of illumination at a predetermined place on the specimen, as well as the focusing and power of said laser beam, so as to confine the temperature in the mass of the material to a range of temperatures both greater than the thermal decomposition temperature of the matrix resin and below the temperature of altering the physical properties of the fibers, so as to carry out the elimination of the resin without affecting the physical integrity of the fibers, then in reproducing on the material (8) to be treated, at each position of a perforation to be made, the operating conditions of the laser (10, 12) so as to constitute in said material a through passage, as a result of only the local burning of the resin of the matrix of the composite material.

3 Claims, 1 Drawing Sheet

PROCESS FOR THE PRODUCTION OF HOLES PARTICULARLY MICRO-PERFORATIONS IN A COMPOSITE MATERIAL, DEVICE FOR ITS PRACTICE AND SOUND DAMPING LAYER CONSTITUTED BY SAID MATERIAL

The present invention relates to the production of acoustic attenuation panels, particularly panels of composite material having a low weight-strength ratio, adapted for example for the air inlet or the nacelle of an aircraft engine.

Conventionally, such structures are made of light metal alloys of which one or several sheets are perforated so as to obtain acoustic attenuation.

The perforation of the metal sheet is carried out by known techniques such as molding, piercing or puncturing.

Until now, the use of composite material, constituted of resin impregnated fibers, has not been applicable to the production of such a perforated sheet because the piercing or puncturing of this type of material gives rise to rupture of the fibers and hence the loss of the strength qualities of said material.

To produce holes in a composite material without rupture of the fibers comprising it, it is possible to provide passages or reserves in the composite material before the latter is impregnated with resin. The "dry" composite material is placed in a mold whose lower portion comprises "needles" adapted to penetrate between the fibers of the composite material by separating them, which avoids breaking them. An intermediate portion permits holding the material in place and the upper portion of the mold encloses the whole. The resin is thus introduced under pressure into the mold: it impregnates the fibers, the needles guaranteeing the perforation of the composite material.

This method requires providing a specific mold for composite materials that are to be provided with passage holes. Moreover, the difficulty of unmolding is a frequent problem encountered by producers using this method.

From the document EP 0 314 353, there is known a method which has been proposed to solve this demolding problem. However, this method requires specific tooling and a practice avoiding the composite material sticking to the mold, and so is complicated and costly.

Moreover, laser is commonly used, including in the field of composite materials, but essentially to produce cutouts through the entire thickness of a skin of composite material for example, because of the property of the laser to concentrate at a point a very high level of power, which inevitably damages the fibers and give rise to their rupture.

The present invention seeks precisely to overcome the various drawbacks of the known techniques for perforation or production of passage holes in a sheet material, by providing a process adapted for the production of holes and particularly micro-perforations in a composite material in a precise and effective manner without damaging the fibers of said composite material.

To this end, the invention has for its object a process for the production of holes, particularly micro-perforations, in a composite material, constituted of mineral or organic fibers embedded in a resin matrix, characterized in that it consists:

in a preliminary step, carrying out tests on a specimen of the composite material to be perforated, with the help of a laser beam directed substantially perpendicularly to the surface of said specimen, said tests consisting in adjusting the duration of illumination of a predetermined position on the specimen, as well as the focus and the power of said laser beam, so as to confine the temperature in the mass of composite material within a range of temperatures both greater than the thermal decomposition temperature of the resin matrix and below the temperature of alteration of the physical properties of the fibers, so as to effect elimination of the resin without affecting the physical integrity of the fibers, then, in reproducing on the material to be treated, at each position of a hole or perforation to be produced, the conditions of operation of the laser so as to constitute in said material, at said position, a through-hole or passage, following only the local burning of the resin of the matrix of the composite material.

Preferably, the step of reproduction on the material to be treated of said conditions of operations of the laser is carried out automatically by programming, on the one hand, of the parameters of controlling the operation of the laser and, on the other hand, of controlling the movement of the laser seam relative to the various positions or perforation.

The composite material to be treated is constituted for example of a skin formed of one layer or several stacked layers, of a pre-impregnated glass fiber cloth.

Such a skin can preferably constitute the acoustic damping layer of an acoustic attenuation panel of the sandwich structure type comprising a cellular core flanked, on the side opposite said damping layer, with a rear rereflector.

It is easy to perforate, according to the invention, in such a damping layer, the number of micro-perforations, on which the open proportion of the surface depends, desired for adaptation to the ranges of sonic frequencies to dampen, which is to say is a function of the engine in the case of a panel for nacelles. Such an acoustic damping layer fulfills both a function of dissipation by its micro-perforations and a structural function by its fibers which moreover are intact and ensure the transmission of force.

The resistive layer of the panel thus constituted has a low weight-strength ratio that is truly optimum, very much less than that of the resistive layers with known equivalent dissipating properties constituted by a metallic cloth, a perforated metallic sheet, or two superposed layers, one structural and the other porous and dissipating.

The invention also has for its object a device for practicing the above process and more particularly for practicing the industrial phase, which is to say the reproduction on a composite material to be treated, at desired positions, conditions of operation of the laser that are predetermined in the preliminary phase of the tests.

Such a device uses a laser of suitable characteristics and is characterized in that it comprises means for controlling the power and the focus of the laser, means for controlling the relative movement between the laser head and the material to be treated, constituted by at least one woven layer, in at least two orthogonal directions parallel to the plane of said layer, and computer control means for said control means according to a pre-established program.

Other characteristics and advantages of the invention will become apparent from the description which follows of one embodiment of the process defined above, which description is given by way of example only, and with respect to the accompanying drawing, in which:

BRIEF DESCRIPTION OF THE DRAWINGS

FIG. 1 shows a block of composite material formed from a stack of cloths constituted by fibers pre-impregnated with a suitable resin.

By fibers, there is intended an assembly, of square, round or rectangular cross-section, of filaments, strips of filaments, roving, tresses or strands of filaments, of different nature, for example of carbon, glass, nylon or "Kevlar", provided that the fibers degrade at a temperature greater than the melting temperature of the resin.

The resin for impregnating the fibers is preferably a thermoplastic resin but the process of the invention can if desired be practiced with composite materials with thermosetting resins.

Figure 1:
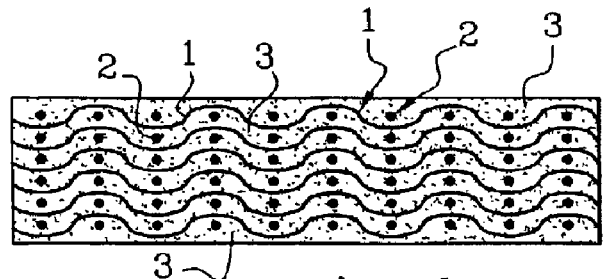
FIG. 1 is a schematic cross-sectional view of a conventional unmachined composite material.

The composite material of FIG. 1 is shown in cross-section after pulmerization or consolidation of the impregnating resin and comprises a stack of cloths formed of warp fibers 1 and weft fibers 2, embedded in a resin matrix 3.

Figure 2:
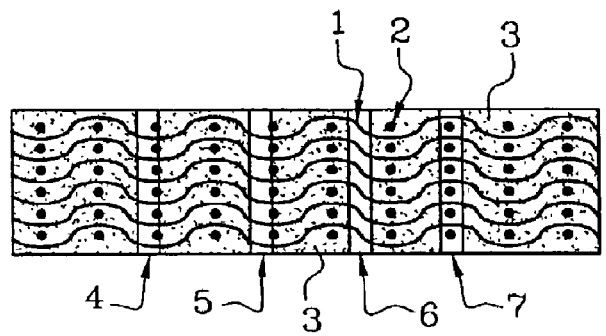
FIG. 2 shows the material of FIG. 1 after machining according to the process of the invention.

In FIG. 2, there is shown respectively at 4, 5, 6 and 7 through-holes or perforations entirely through the thickness of the block of composite material, perpendicular to the plane of the stacked cloths (1, 2).

According to the invention, these through-passages are made with the help of a laser whose thermal action is controlled so as to modify point-wise the adhesion characteristics of the resin 3, in other words by bringing locally the temperature of the composite material above the decomposition of pyrolysis temperature of the resin, which is of the order of 350 to 450° C. in an oxidizing atmosphere, according to the types of resin, whilst remaining substantially below the temperature adapted to alter the physical properties of the fibers, in particular the decomposition temperature.

This decomposition temperature of the fibers is substantially greater than that of pyrolysis of the usual resins and is for example of the order of 1500° C. for carbon fibers.

A regulation of the laser power such that at all points of the mass of the composite material where the effects of the laser are to be seen, the local maximum temperature will be contained within a range of temperature substantially greater than the pyrolysis temperature of the interfibrous resin whilst remaining substantially below the temperatures affecting the integrity of the fibers, is therefore possible. Thus, by application of a laser beam substantially perpendicular to one of the surfaces of the composite material, by focusing said beam correctly, there are produced throughout the mass of the composite material said passages in the form of wells (4 to 7) that are approximately cylindrical, constituted by removal of the resin (3), only the intact fibers (1, 2) remaining within and/or on the sides of said passages.

Because the fibers (1, 2) are not accurately aligned and straight, the weaving is not absolutely regular and its characteristics can vary from one composite material to another, and because the diameter of the perforations to be produced can vary and the position of the axis of the laser beam is random relative to the meshes of the cloth, the geometry of the perforations (4 to 7) can be variable from one perforation to the other, one perforation being able, as shown in FIG. 2, to be larger than another by stripped fibers that are not degraded, the essence being that the continuity of the passage will be ensured from one surface to the other of the composite material and that the overall quantity of open surface of the composite material thus perforated will correspond to the desired acoustical characteristics, which are measured easily with the help of an airflow resistance bed.

The perforations (4 to 7) have a cross-section of the order of several square millimeters and are for example approximately cylindrical and of a diameter between 2 and 3 mm, or else of square or rectangular cross-section (3 mm×2 mm for example).

Figure 3:
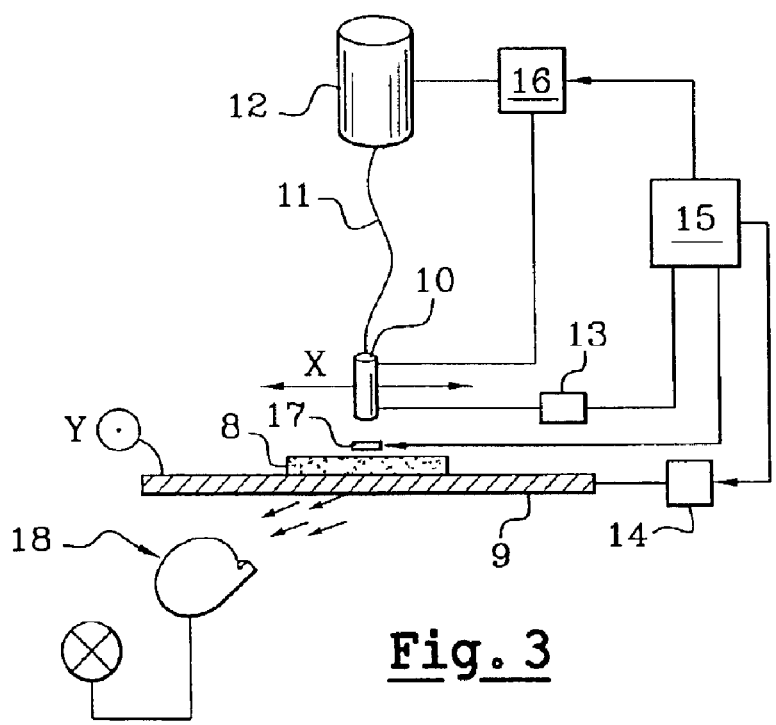
FIG. 3 is a diagram showing a device adapted to carry out the machining shown in FIG. 2.

FIG. 3 shows schematically a device adapted to practice the process of the invention on a composite material 8 constituted by a flat consolidated skin formed by one or several layers each formed from a fiber cloth impregnated with a thermoplastic resin.

The skin 8 is disposed on a machining table 9 of a digitally controlled machine, for example.

Above the table 9 is mounted a laser head 10 with a vertical axis connected by an optical fiber 11 to a laser source 12, for example of the Yag type.

The laser head 10 is movable horizontally in the X direction under the influence of means symbolically shown at 13, whilst the table 9 is movable horizontally in the Y direction, which is to say perpendicular to the plane of FIG. 3, under the influence of means indicated at 14.

The moving means 13 and 14 are controlled and synchronized with the help of program controlled computer means 15, also connected, on the one hand, to means 16 for controlling the power of laser 12 and for focusing the beam of the head 10 and, on the other hand, to means symbolized at 7 for controlling sweeping of the laser beam.

Preferably, below the table 9, which is a metallic grill for example, is disposed a system 18 for suctioning gas and residues of the pyrolysis generated by burning the resin of the composite material.

The process of the invention comprises a preliminary phase of determining the operative machining parameters, namely the instantaneous power of the laser, the focus of the beam, if desired the sweeping of the beam when the diameter of the beam is less than the size of the perforation to be produced, and the duration of illumination of the composite material by the laser beam.

To this end, instead of skin 8, there will be placed on the able 9 a specimen of the skin and there will be carried out a series of tests to obtain perforations fulfilling the conditions, namely the complete local elimination of the resin without damaging the physical integrity of the fibers present.

The useful parameters are recorded for each test, then the count is taken of those corresponding to the concluding tests and these parameters are programmed into the computer system 15, as are the movements of the table 9 and of the head 10 to produce the number of perforations necessary in the skin 8, as a function of the range of sonic frequencies to dampen.

The skin 8 to be machined is then emplaced on the table 9 and the machine will automatically produce said perforations.

Preferably, the laser used will be a pulsed mode laser, easier to control than a continuous laser.

The duration of illumination of each position of the skin 8 is of the order of several seconds and it is possible without problems to perforate skins of a thickness up to several millimeters.

If it is a composite material with thermoplastic resin, is it easy to provide on a flat skin 8 the necessary perforations, then to assemble this skin with other constituents, cellular core and rear reflector, in a suitable mold under the usual conditions for pulimerzation of binding resins whose melting temperature, of the order of 180° C. is below the melting temperature, of the order of 280° C. of the usual thermoplastic resins. The perforations preliminarily produced in the acoustic attenuation layer, constituted by said perforated skin, will not be blocked by the resin of the skin in the course of production of the panel.

It is thus possible to produce the perforations in the skin 8 only at the time on fabrication of the panel, the acoustic adaptation of the panel being adapted to be adjusted to the desired characteristics of the panel, as a function of the position where it will be mounted and its environment, which gives much more flexibility to the process. For example, for air intakes of the same size adapted for engines of different characteristics, there could be produced panels with acoustic attenuation layers of identical structure and differing simply by the number, or even the shape and distribution of the perforations.

The skin 8 machined according to the invention can be used alone or in association with any other acoustic attenuation structure of the sandwich or multi-layer type.

The process of the invention can also be used for composite materials with thermosetting resin, although the operation will be a bit more difficult because the perforations can be produced only on one skin or layer, and once produced the assembly of the various constituents thicken only on one skin or layer, once the assembly of the various constituents of the acoustic panel takes place. It is thus necessary to produce said perforations after the last operation of heating in an autoclave of the assembly, otherwise the perforations will be in danger of being blocked during passage through the autoclave. This therefore requires particular tooling permitting controlling the laser on a shaped piece.

The process of the invention permits producing acoustic attenuation panels with a single resistive Layer not requiring the addition of a structural layer because said single resistive layer plays both the role of acoustic dissipation and that of structural reinforcement and this with a layer thickness that can be reduced to the minimum, which is to say truly ensuring an extremely reduced weight-strength ratio.

A resistive layer according to the invention is finally, in addition to the weight, more interesting than a resistive layer constituted by a simple cloth or metallic sheet as to other points.

The layer according to the invention, solely in composite material, permits having a good homogeneity of a panel whose other constituents are of identical or compatible materials, because the gluing or assembly of these various constituents will be of high quality.

When the panel is produced with identical or compatible materials, there are avoided problems of corrosion, of galvanic couples and of different thermal expansion, hence no risk of breaking or bending.

Finally, the repair of such a panel is easier than the repair of a panel using metallic cloth, indeed, a patch of composite material is easier to glue on a composite material to be repaired than a patch of metallic cloth on a metallic cloth to be repaired.

What is claimed is:

1. Process for producing holes (4 to 7), particularly micro-perforations, in a composite material, constituted by mineral or organic fibers (1, 2) embedded in a resinous matrix (3), characterized in that it consists:

in a preliminary step, carrying out tests on a specimen of the composite material to be perforated, with a laser beam directed substantially perpendicularly to the surface of said specimen, said tests consisting in adjusting the duration of illumination at a predetermined position on the specimen, as well as the focusing and the power of said laser beam, so as to confine the temperature within the mass of the composite material to a range of temperatures both greater than the thermal decomposition material of the resin matrix (3) and below the temperature of changing the physical properties of the fibers (1, 2), so as to carry out the elimination of the resin without affecting the physical integrity of the fibers, then, in reproducing on the material to be treated, at each position of a hole or perforation to be produced, the conditions of operation of the laser (10, 12) so as to constitute in said material, at said position, a through-hole or passage, resulting from only local burning of the resin of the matrix of the composite material.

2. Process according to claim 1, characterized in that the step of reproduction on the material to be treated of said conditions of operation of the laser (10, 12) is carried out automatically by programming, on the one hand, parameters of controlling the operation of the laser and, on the other hand, controlling the movement of the laser beam relative to the various position of perforation.

3. Process according to claim 1 or 2, characterized in that during the step of reproduction on the material to be treated of said conditions of operation of the laser (10, 12), the beam of this latter is subjected to sweeping of the position where a perforation is to be produced.

\* \* \* \* \*